United States Patent
Siden et al.

(10) Patent No.: US 8,628,297 B2
(45) Date of Patent: Jan. 14, 2014

(54) TIP FLOWPATH CONTOUR

(75) Inventors: Gunnar Leif Siden, Greenville, SC (US); Craig Allen Bielek, Greenville, SC (US)

(73) Assignee: General Electric Company, Schenectady, NY (US)

( * ) Notice: Subject to any disclaimer, the term of this patent is extended or adjusted under 35 U.S.C. 154(b) by 721 days.

(21) Appl. No.: 12/859,970

(22) Filed: Aug. 20, 2010

(65) Prior Publication Data
US 2012/0042654 A1 Feb. 23, 2012

(51) Int. Cl.
*F01D 25/24* (2006.01)

(52) U.S. Cl.
USPC .......................... 415/207; 415/227

(58) Field of Classification Search
USPC .............. 415/207, 220, 227, 228; 416/193 A, 416/189, 228
See application file for complete search history.

(56) References Cited

U.S. PATENT DOCUMENTS

| | | | |
|---|---|---|---|
| 2,806,645 A | 9/1957 | Stalker | |
| 3,552,877 A | 1/1971 | Christ | |
| 3,746,469 A * | 7/1973 | Mason | 416/213 R |
| 4,802,821 A * | 2/1989 | Krietmeier | 415/208.2 |
| 4,910,958 A | 3/1990 | Kreitmeier | |
| 5,203,674 A | 4/1993 | Vinciguerra | |
| 5,588,799 A | 12/1996 | Kreitmeier | |
| 5,707,208 A * | 1/1998 | Kreitmeier | 415/211.2 |
| 6,283,713 B1 * | 9/2001 | Harvey et al. | 416/193 A |
| 6,488,470 B1 | 12/2002 | Owczarek | |
| 6,602,046 B2 * | 8/2003 | Kraus | 415/1 |
| 6,779,973 B2 | 8/2004 | Ito et al. | |
| 6,802,695 B2 * | 10/2004 | Haller | 416/223 R |
| 7,410,343 B2 | 8/2008 | Wakazono et al. | |
| 2005/0066647 A1 * | 3/2005 | Wiebe et al. | 60/39.5 |
| 2009/0191052 A1 | 7/2009 | Haller | |

OTHER PUBLICATIONS

Lingner, Dr. Ulrich, "50Hz Heavy Duty Gas Turbines—Experience and Evolution", Siemens Power Generation, 2004.
Ito, Eisaku, et al. "Advanced Turbine Aerodynamic Design Utilizing a Full Stage CFD", ASME Turbo Expo 2006: Power for Land, Sea and Air, Barcelona, Spain May 8-11, 2006.
Helmers, Lennard, "Development and Validation of the Siemens New Class of Heavy Duty Gas Turbines", 8th European Turbomachinery Conference-ETC8, Graz, Austria, Mar. 23-27, 2009.
Nordlund, Scott, et al. "Advanced SGT6-5000F Development", 18th Symposium of the Industrial Application of Gas Turbines Committee, Banff, Alberta, Canada, Oct. 19-21, 2009.
U.S. Appl. No. 12/859,924, Non-Final Office Action, May 16, 2013, 15 pgs.

* cited by examiner

*Primary Examiner* — Edward Look
*Assistant Examiner* — Liam McDowell
(74) *Attorney, Agent, or Firm* — Cantor Colburn LLP

(57) ABSTRACT

An apparatus is provided and includes a turbine including a casing and a turbine bucket having a tip proximate to the casing and a trailing edge defined relative to a direction of fluid flow through the turbine and a diffuser, defined between a central surface and a downstream section of the casing, which is fluidly coupled to the turbine and disposed downstream from the trailing edge, a slope of the downstream section of the casing being angled by at least 6 degrees relative to a slope of the tip within about 0.5 turbine bucket chord lengths as measured at the tip from the trailing edge, and the central surface and the downstream section of the casing being at least substantially parallel or divergent from the trailing edge.

19 Claims, 4 Drawing Sheets

TIP FLOWPATH CONTOUR

CROSS REFERENCE TO RELATED APPLICATION

This application is related to the application entitled "HUB FLOWPATH CONTOUR," which is being filed concurrently herewith.

BACKGROUND OF THE INVENTION

The subject matter disclosed herein relates to a hub flow path contour at an interface between an exit of a turbine and an entrance of a diffuser.

In turbines, high energy fluids flow along pathways where they interact with turbine buckets arrayed at varying turbine stages to produce rotation of the turbine buckets about a rotor and mechanical energy. The fluids eventually exit the pathway and enter a diffuser, which is disposed downstream from the last turbine stage. The diffuser serves to condition the flow of the fluids, which are then directed toward additional equipment disposed downstream from the diffuser, such as a heat recovery steam generator (HRSG).

The trend for modern gas turbines, in particular, has been toward increasing exhaust energy and velocities of the fluids. This is largely a result of the demand for increased power output through increased mass flow but the material and mechanical restrictions of the turbine buckets of the last turbine stage often dictate that the turbine exit annulus area may not be able to grow commensurate with the required increase in mass flow associated with the demand. In order to make up the difference, then, it is frequently necessary to increase a turbine exhaust kinetic energy that will reduce gas turbine efficiency unless the kinetic energy can be recovered in the diffuser. A larger area ratio diffuser will allow more of the kinetic energy to be recovered but also will reduce an operability range, which is defined as a region in which the diffuser is well behaved.

When the diffuser is not well behaved, non-uniform flows of the fluids moving toward the downstream equipments pose a risk of damage to that equipment. For example, where the equipment is an HRSG, non-uniform fluid flow leads to vibration and deterioration of the HRSG.

BRIEF DESCRIPTION OF THE INVENTION

According to an aspect of the invention, an apparatus is provided and includes a turbine including a casing and a turbine bucket having a tip proximate to the casing and a trailing edge defined relative to a direction of fluid flow through the turbine and a diffuser, defined between a central surface and a downstream section of the casing, which is fluidly coupled to the turbine and disposed downstream from the trailing edge, a slope of the downstream section of the casing being angled by at least 6 degrees relative to a slope of the tip within about 0.5 turbine bucket chord lengths as measured at the tip from the trailing edge, and the central surface and the downstream section of the casing being at least substantially parallel or divergent from the trailing edge.

According to another aspect of the invention, an apparatus is provided and includes a turbine including a casing and a turbine bucket having a tip proximate to the casing and a trailing edge defined relative to a direction of fluid flow through the turbine and a diffuser fluidly coupled to the turbine and disposed downstream from the trailing edge, which is formed to define a diffuser flow path from the trailing edge and within a downstream section of the casing that has an at least un-diminishing cross-sectional area from the trailing edge, a slope of the downstream section of the casing being angled by at least 6 degrees relative to a slope of the tip within about 0.5 turbine bucket chord lengths of the turbine bucket as measured at the tip from the trailing edge.

According to yet another aspect of the invention, an apparatus is provided and includes a turbine including a platform, a casing and a turbine bucket having a hub coupled to the platform, a tip proximate to the casing and a trailing edge defined relative to a direction of fluid flow through the turbine and a diffuser, defined between a central surface and a downstream section of the casing, which is fluidly coupled to the turbine and disposed downstream from the trailing edge, at least one or more of a slope of the hub being angled by at least 6 degrees relative to a slope of the central surface within about 0.5 turbine bucket chord lengths as measured at the hub from the trailing edge and a slope of the downstream section of the casing being angled by at least 6 degrees relative to a slope of the tip within about 0.5 turbine bucket chord lengths as measured at the tip from the trailing edge, and the central surface and the downstream section of the casing being at least substantially parallel or divergent from the trailing edge.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
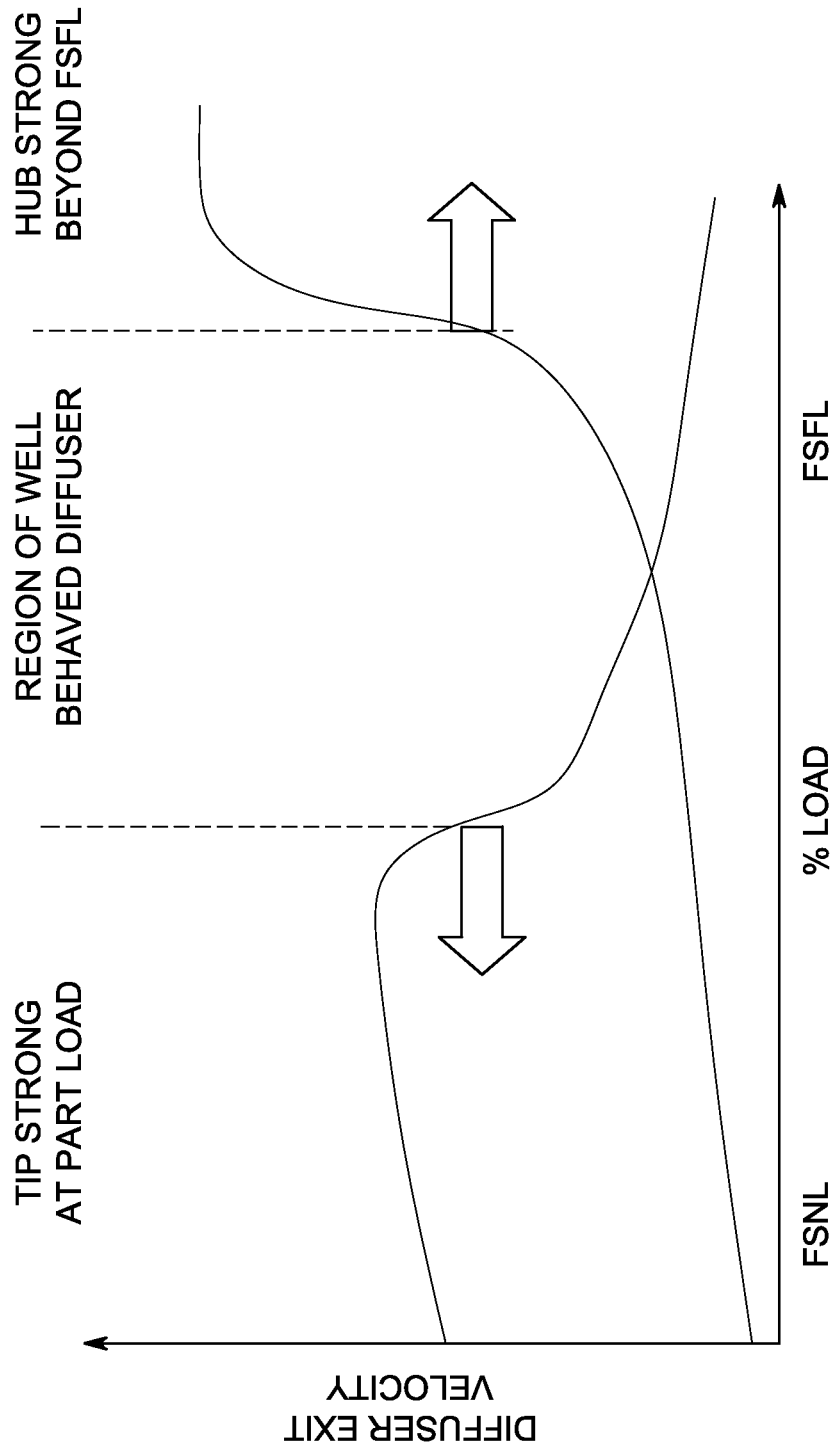
FIG. 1 is a graphical illustration of diffuser behaviors at varying loads.

With reference to FIG. 1, a graphical illustration of diffuser behaviors at varying loads is provided. As shown in FIG. 1, diffuser exit velocities are maintained at a relatively low velocity where the diffuser is relatively well behaved when the turbine is run at medium percentage load. At part load condition, such as the full speed no load (FSNL) condition, the exit flow profile of a turbine is characterized by particularly low hub velocities and relatively high tip velocities and at a specific part load condition, the diffuser hub boundary layer will separate and result in reduced performance and increasingly non-uniform and tip-strong diffuser exit flow. By contrast, at relatively high load conditions an opposite effect occurs and results in non-uniform hub-strong exit flow.

In accordance with aspects, a hub flow path contour is provided having a concave curvature proximate to a last stage bucket and an entrance of the downstream diffuser. The concave curvature causes a local increase in the static pressure that will result in the bucket having a reduced work extraction in the immediate vicinity of the hub wall. This reduced work extraction causes a radial velocity distribution that is characterized by fluids entering the diffuser with locally higher velocities close to the hub wall. This "energized" hub boundary layer can sustain more diffusion without separating, thereby allowing a larger area ratio diffuser to be used resulting in improved performance. A similar tip flow path contour may be provided on the turbine casing to provide for an energized tip boundary layer as well. As such, in accordance with aspects and as shown in FIG. 1, the well behaved region of the diffuser can be expanded toward the full speed no load region (FSNL) and the full speed full load (FSFL) region.

Figure 2:
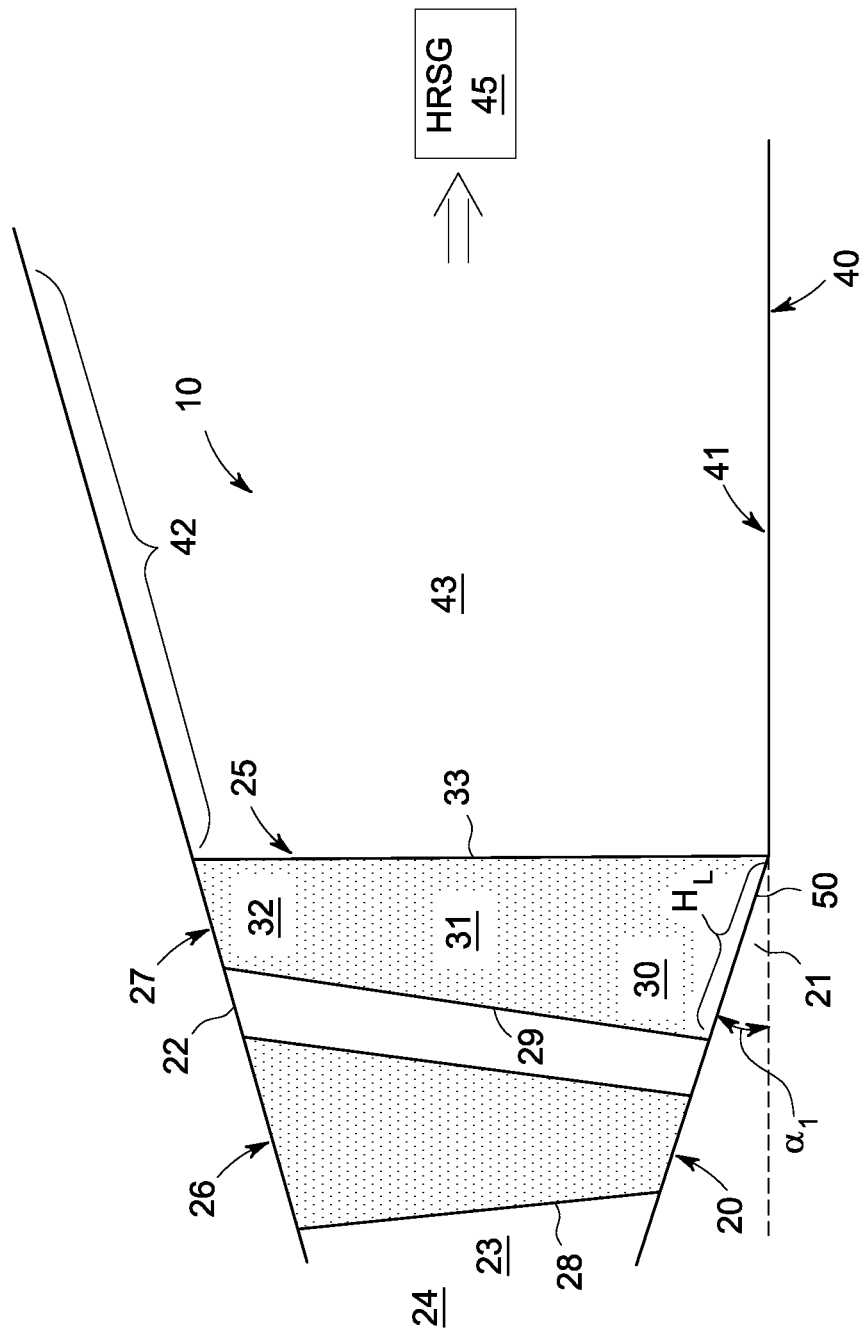
FIG. 2 is a side view of a turbine and a diffuser according to embodiments.
Figure 3:
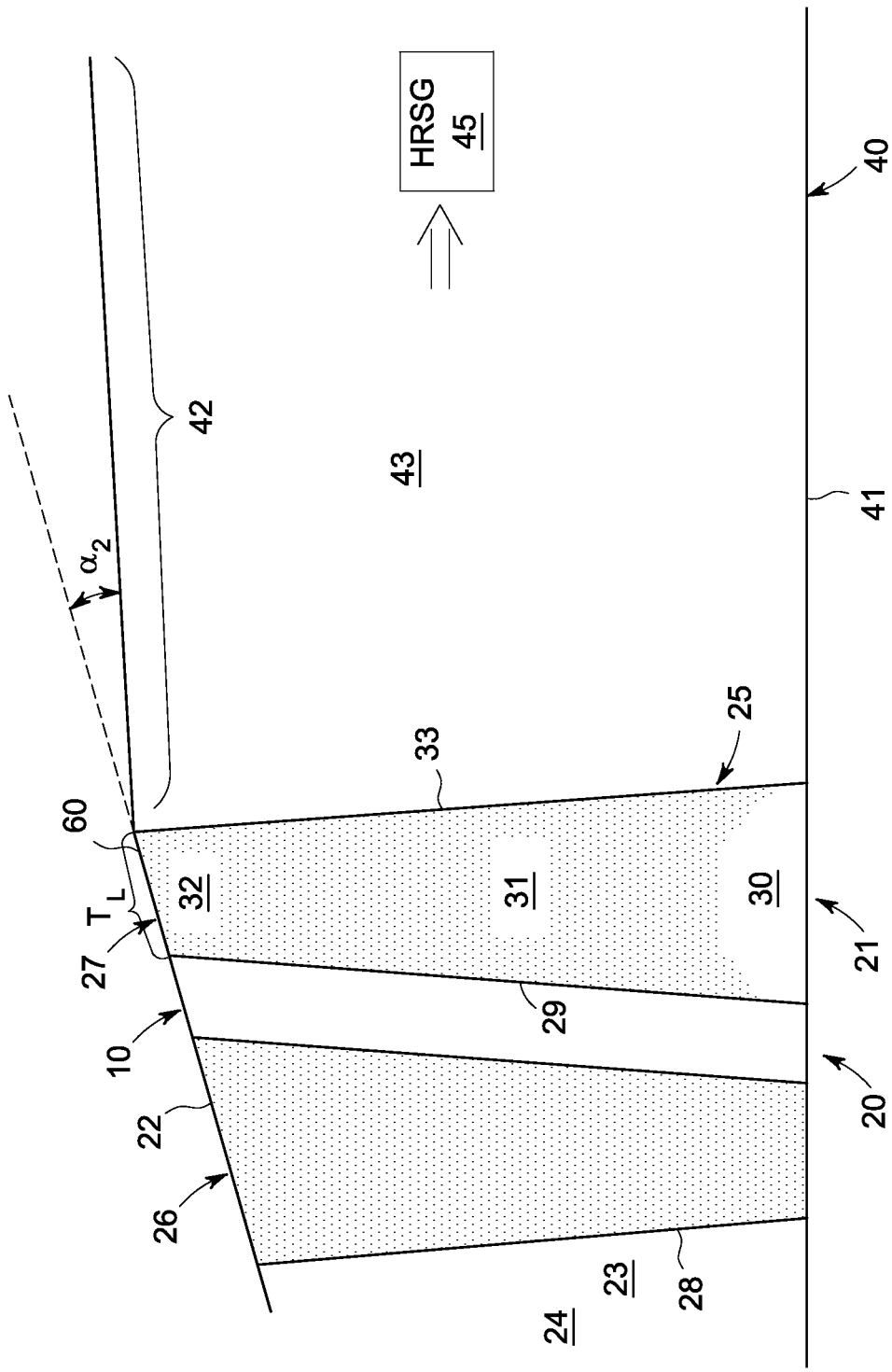
FIG. 3 is a side view of a turbine and a diffuser according to alternative embodiments.

With reference to FIGS. 2 and 3, an apparatus 10 is provided and includes a turbine 20 and a diffuser 40. The turbine 20 includes an annular platform 21 and an annular casing 22 that perimetrically surrounds the annular platform 21 to define a fluid passage 23 along which fluids flow from an upstream section 24 to and through a turbine exit 25. The turbine 20 may be sequentially arranged in stages, such as intermediate stage 26 and last stage 27, relative to a direction of fluid flow along the fluid passage 23. At each stage, an array of turbine buckets, such as intermediate stage turbine bucket 28 and last stage turbine bucket 29, are arrayed circumferentially around the annular platform 21.

The last stage turbine bucket 29 includes a hub 30, which is coupled to an outer radial section of the annular platform 21, an airfoil section 31 having an airfoil shape that interacts with the fluids flowing through the fluid passage 23 and extending radially from the hub 30 and a tip 32. The tip 32 is disposed at a distal end of the airfoil section 31 and is proximate to an interior surface of the annular casing 22. The last stage turbine bucket 29 further includes a trailing edge 33, which is defined along an aft side of the hub 30, the airfoil section 31 and the tip 32 relative to a direction of fluid flow along the fluid passage 23.

With each turbine bucket in the respective array at each stage formed substantially as described above, mechanical energy can be derived from the rotation of the turbine buckets at each of the stages caused by the interaction of the fluid flowing along the fluid passage 23 with the turbine buckets.

The diffuser 40 is defined between a central surface 41, which may be the exterior facing surface of a diffuser central body, and a downstream section 42 of the casing 22. The diffuser 40 is fluidly coupled to the turbine 20 and is disposed downstream from the trailing edge 33 of the last stage turbine bucket 29. Thus, as fluids flow over and past the trailing edge 33 of the last stage turbine bucket 29, the fluids exit the turbine 20 and enter the diffuser 40. Within the diffuser 40, the fluids flow along a diffuser flow path 43 whereby the fluid flow is conditioned for further use downstream in, for example, a heat recovery steam generator (HRSG) 45.

As shown in FIG. 2, a slope of the hub 30, which is defined at a hub border 50 between the hub 30 and the annular platform 21, may be kinked or angled by at least 6 degrees relative to a slope of the central surface 41. The kinking or angling may occur at the trailing edge 33 or at least within about 0.5 turbine bucket chord lengths, $H_L$, from the trailing edge 33. The chord length, $H_L$, is measured at the hub 30 and/or along the hub border 50.

The sloped hub 30 forms an angle $\alpha_1$ with the sloped central surface 41. In accordance with embodiments, the angle $\alpha_1$ is greater than or equal to 6 degrees as measured from a plane of the central surface 41 and, in particular, may be about 10 degrees or more. Also, the central surface 41 and the downstream section 42 of the casing 22 are at least substantially parallel or divergent from one another as observed from the trailing edge 33 and proceeding downstream through the diffuser 40. That is, the diffuser 40 may be a larger area ratio diffuser and the diffuser flow path 43 may have an at least un-diminishing cross-sectional area from the trailing edge 33 and may, in some cases, have an increasing cross-sectional area from the trailing edge 33.

As shown in FIG. 3, a slope of the downstream section 42 of the casing 22 may be kinked or angled by at least 6 degrees relative to a slope of the tip 32, which is defined axially along a radially distal end of the tip 32. The kinking or angling may occur at the trailing edge 33 or at least within about 0.5 turbine bucket chord lengths, $T_L$, from the trailing edge 33. The chord length, $T_L$, is measured at the tip 32.

The sloped downstream section 42 forms an angle $\alpha_2$ with the sloped tip 32. In accordance with embodiments, the angle $\alpha_2$ is greater than or equal to 6 degrees as measured from a plane of the tip 32 and, in particular, may be about 10 degrees or more. Also, the central surface 41 and the downstream section 42 of the casing 22 are at least substantially parallel or divergent from one another as observed from the trailing edge 33 and proceeding downstream through the diffuser 40. That is, the diffuser 40 may be a larger area ratio diffuser and the diffuser flow path 43 may have an at least un-diminishing cross-sectional area from the trailing edge 33 and may, in some cases, have an increasing cross-sectional area from the trailing edge 33.

Figure 4:
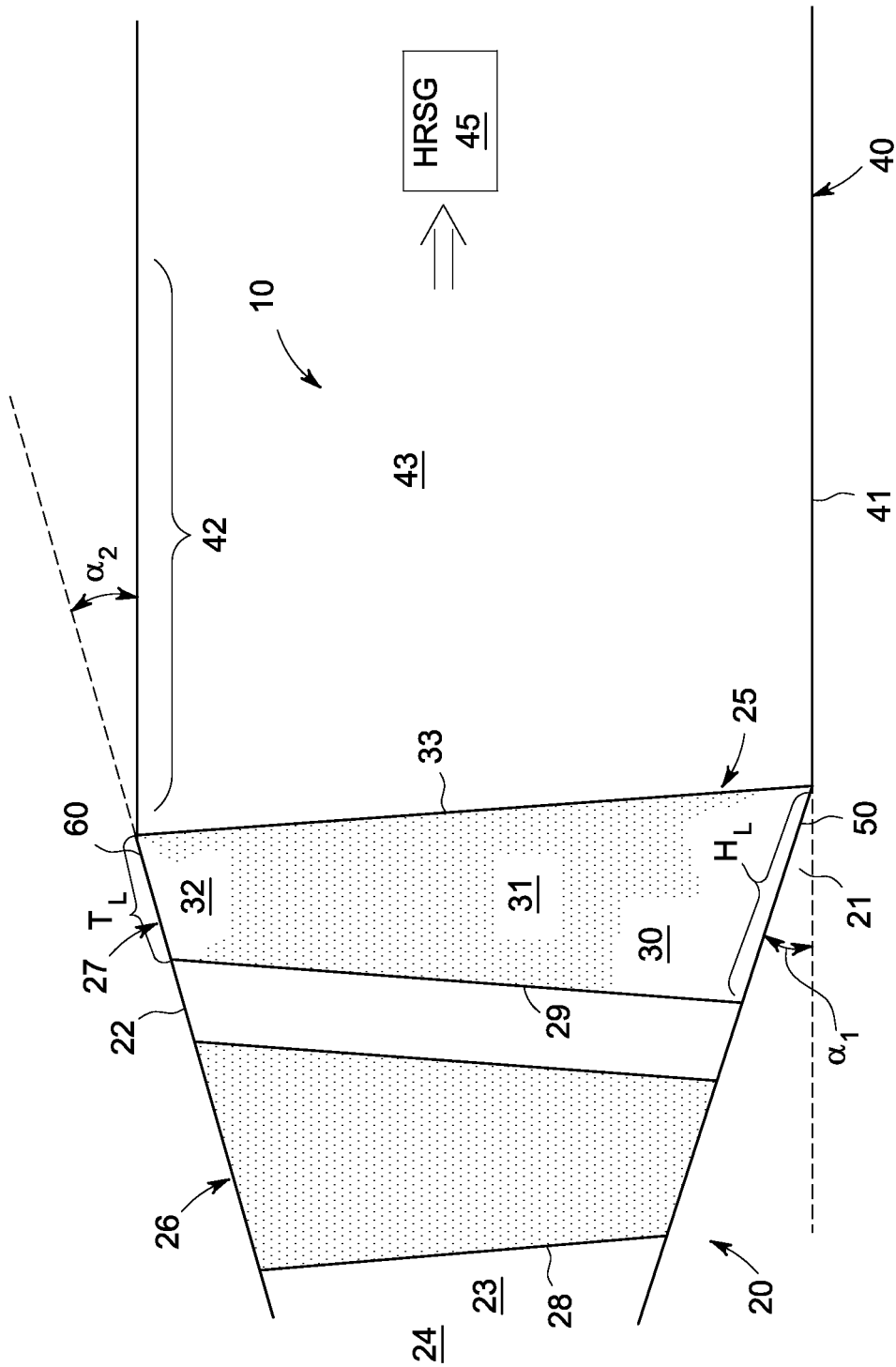
FIG. 4 is a side view of a turbine and a diffuser according to further embodiments.

With reference to FIG. 4 and, in accordance with additional embodiments, the features described above reference to FIGS. 2 and 3 may be combined. That is, a slope of the border between the hub 30 and the platform 21 may be kinked or angled relative to a slope of the central surface 41 and a slope of the downstream section 42 of the casing 22 may be kinked or angled relative to a slope of the tip 32. This kinking or angling may occur within about 0.5 turbine bucket chord lengths measured at the hub 30 and the tip 32, respectively, from the trailing edge 33 and may be formed by the hub 30 border forming an angle with the slope of the central surface 41 and by the downstream section 42 of the casing 22 forming an angle with the slope of the tip 32, respectively. As described above, the kinking or angling of each may be greater than or equal to 6 degrees and, in particular, may be about 10 degrees or more as measured as described above. Also, the central surface 41 and the downstream section 42 of the casing 22 are at least substantially parallel or divergent from one another as observed from the trailing edge 33 and proceeding downstream through the diffuser 40.

The kinking or angling at the hub 30, the tip 32 or both may increase static and total pressures at the central surface 41 and at the downstream section 42 of the casing 22 proximate to the trailing edge 33. As a result, at positions within the diffuser 40 further downstream, static pressure may be substantially uniform. As such, damage to the HRSG 45 or any other equipment may be avoided or substantially reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
    a turbine including a casing and a rotatable turbine bucket having a tip proximate to the casing and a trailing edge defined relative to a direction of fluid flow through the turbine; and
    a diffuser, defined between a central surface and a downstream section of the casing, which is fluidly coupled to the turbine and disposed downstream from a plane aligned with the trailing edge,
    a slope of the downstream section of the casing being angled by at least 6 degrees relative to a slope of the tip within about 0.5 turbine bucket chord lengths as measured at the tip from the trailing edge, and
    an end portion of the central surface being substantially straight along and parallel with an axial dimension and the central surface and the downstream section of the casing being at least substantially parallel or divergent from the trailing edge.

2. The apparatus according to claim 1, wherein the turbine bucket comprises a last stage turbine bucket.

3. The apparatus according to claim 1, wherein the slope of the tip is defined axially along a radially distal end of the tip.

4. The apparatus according to claim 1, wherein a difference between the slope of the downstream section of the casing and the slope of the tip is about 10 degrees or more.

5. The apparatus according to claim 1, wherein the central surface and the downstream section of the casing are divergent from the trailing edge.

6. The apparatus according to claim 1, further comprising equipment, including a heat recovery steam generator (HRSG), disposed downstream from the diffuser and to which the fluids flow from the diffuser.

7. An apparatus, comprising:
    a turbine including a casing and a rotatable turbine bucket having a tip proximate to the casing and a trailing edge defined relative to a direction of fluid flow through the turbine; and
    a diffuser fluidly coupled to the turbine and disposed downstream from a plane aligned with the trailing edge, which is formed to define a diffuser flow path from the trailing edge and within a downstream section of the casing and a central surface, an end portion of which is substantially straight along and parallel with an axial dimension, and which has an at least un-diminishing cross-sectional area from the plane aligned with the trailing edge,
    a slope of the downstream section of the casing being angled by at least 6 degrees relative to a slope of the tip within about 0.5 turbine bucket chord lengths of the turbine bucket as measured at the tip from the trailing edge.

8. The apparatus according to claim 7, wherein the turbine bucket comprises a last stage turbine bucket.

9. The apparatus according to claim 7, wherein the slope of the tip is defined axially along a radially distal end of the tip.

10. The apparatus according to claim 7, wherein a difference between the slope of the downstream section of the casing and the slope of the tip is about 10 degrees or more.

11. The apparatus according to claim 7, further comprising equipment, including a heat recovery steam generator (HRSG), disposed downstream from the diffuser and to which the fluids flow from the diffuser.

12. An apparatus, comprising:
    a turbine including a platform, a casing and a rotatable turbine bucket having a hub coupled to the platform, a tip proximate to the casing and a trailing edge defined relative to a direction of fluid flow through the turbine; and
    a diffuser, defined between a central surface and a downstream section of the casing, which is fluidly coupled to the turbine and disposed downstream from a plane aligned with the trailing edge,
    at least one of a slope of the hub being angled by at least 6 degrees relative to a slope of the central surface within about 0.5 turbine bucket chord lengths as measured at the hub from the trailing edge and a slope of the downstream section of the casing being angled by at least 6 degrees relative to a slope of the tip within about 0.5 turbine bucket chord lengths as measured at the tip from the trailing edge, and
    an end portion of the central surface being substantially straight along and parallel with an axial dimension and the central surface and the downstream section of the casing being at least substantially parallel or divergent from the plane of the trailing edge.

13. The apparatus according to claim 12, wherein the turbine bucket comprises a last stage turbine bucket.

14. The apparatus according to claim 12, wherein the slope of the hub is defined at a border between the hub and the platform.

15. The apparatus according to claim 12, wherein the slope of the tip is defined axially along a radially distal end of the tip.

16. The apparatus according to claim 12, wherein a difference between the slope of the hub and the slope of the central surface is about 10 degrees or more.

17. The apparatus according to claim 12, wherein a difference between the slope of the downstream section of the casing and the slope of the tip is about 10 degrees or more.

18. The apparatus according to claim 12, wherein the central surface and the downstream section of the casing are divergent from the trailing edge.

19. The apparatus according to claim 12, further comprising equipment, including a heat recovery steam generator (HRSG), disposed downstream from the diffuser and to which the fluids flow from the diffuser.

* * * * *